United States Patent [19]

Palmer

[11] Patent Number: 5,000,221
[45] Date of Patent: Mar. 19, 1991

[54] FLOW CONTROL SYSTEM

[76] Inventor: David W. Palmer, 200 Berkeley Rd., North Andover, Mass. 01845

[21] Appl. No.: 405,835

[22] Filed: Sep. 11, 1989

[51] Int. Cl.⁵ ............................................ G05D 16/10
[52] U.S. Cl. ................... 137/505.38; 137/907; 251/901
[58] Field of Search ................ 137/505, 907, 505.38, 137/502, 503; 251/901, 5

[56] References Cited

U.S. PATENT DOCUMENTS

| | | | |
|---|---|---|---|
| 2,918,933 | 12/1959 | Boitnott | 137/502 |
| 3,053,272 | 9/1962 | Babson | 137/907 X |
| 3,138,174 | 6/1964 | Gilpin | 137/503 X |
| 3,237,616 | 3/1966 | Daigh et al. | 251/5 X |
| 3,605,788 | 9/1971 | Brown | 137/502 X |
| 4,732,190 | 3/1988 | Polselli | 137/503 X |
| 4,791,956 | 12/1988 | Kominami et al. | 137/503 |

FOREIGN PATENT DOCUMENTS

| | | | |
|---|---|---|---|
| 532356 | 8/1931 | Fed. Rep. of Germany | 137/503 |
| 957118 | 5/1964 | United Kingdom | 137/907 |

Primary Examiner—Stephen M. Hepperle
Attorney, Agent, or Firm—Bromberg & Sunstein

[57] ABSTRACT

To control the flow of a fluid from an environment to a vacuum source, a device including a piston (2) is mounted in the path of the fluid. The path is not vented so that the mass of fluid entering the device is equal to the mass exiting the device. The piston (2) is mounted so that it may constrict the path at a constriction point (5), and so that it may move in a direction (14) transverse to the flow of the fluid at the constriction point (5). The frontal face (15) of the piston (2) is exposed to the fluid in the path, and the distal face (16) of the piston (2) is exposed to a reference pressure (17). A restoring force, such as a spring (10) or the weight of the piston (2) is exerted on the piston (2) so as to tend to widen the path at the constriction point (5).

38 Claims, 8 Drawing Sheets

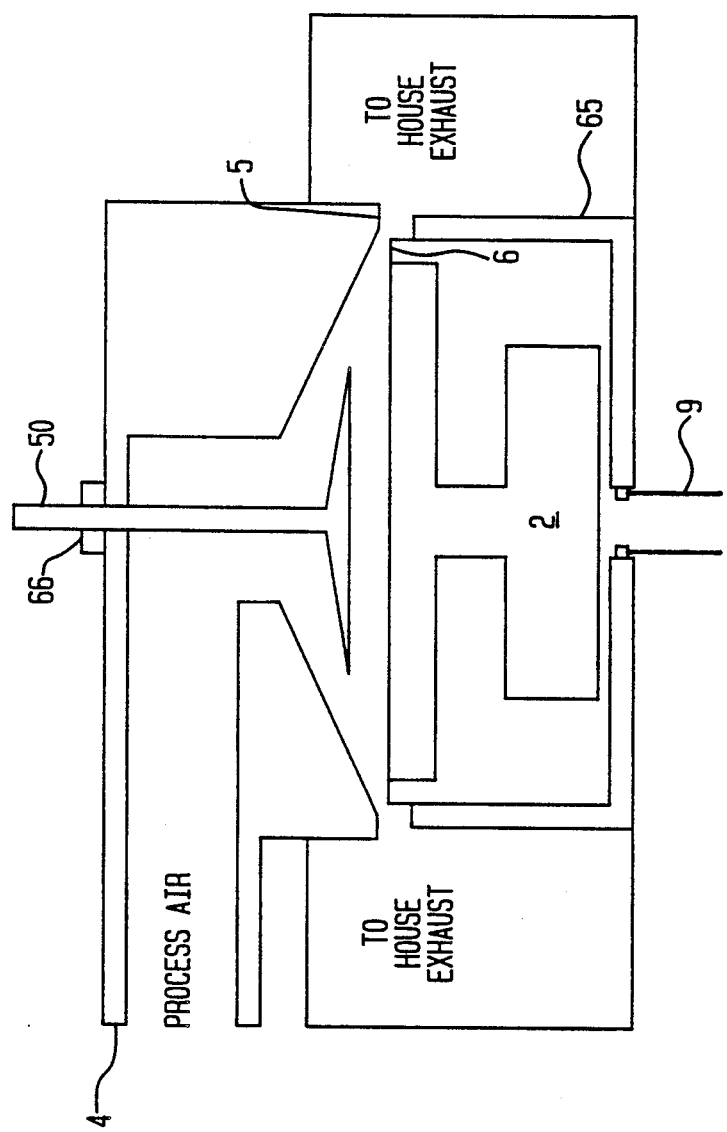

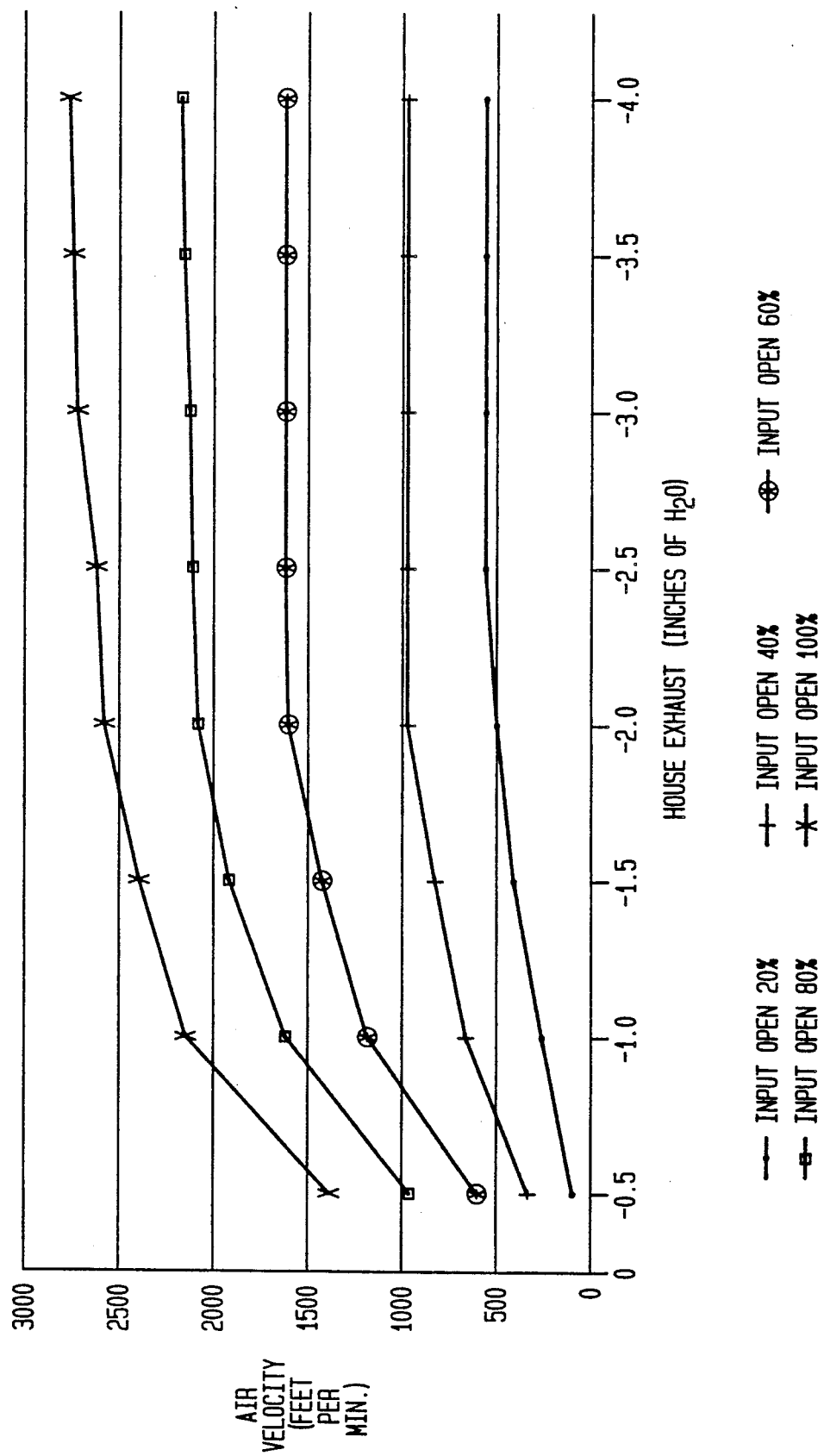

FLOW CONTROL SYSTEM

This application is a continuation-in-part of application No. 07/178,505 filed Apr. 7, 1988 now abandoned by the present inventor, which is hereby incorporated herein by reference.

DESCRIPTION

1. Technical Field

This invention generally relates to a device for regulating the flow of a fluid, in particular a gas, through the device. More particularly, it relates to a device that can maintain a constant a partial vacuum and/or a constant mass flow rate.

2. Background Art

In the manufacture of integrated circuits on semiconductor chips, the need arises for accurately controlling the flow of air or gas. For instance, several steps in this manufacturing process occur in a work environment that must be kept at a partial vacuum with respect to the ambient pressure. In a clean room this ambient pressure is slightly more than atmospheric pressure. Gas is evacuated from this work environment to a house exhaust system. Frequently, the house exhaust system evacuates gas from a number of work environments. Because the vacuum created by the house exhaust system can vary, and because the number of work environments connected to the house exhaust system can vary, each work environment needs a control system in order to avoid wide variations in the partial vacuum in the work environment and/or to control the mass flow rate of gas from the work environment to the house exhaust system. It is often very important to accurately control either the partial vacuum or the mass flow rate; too much or too little gas being evacuated from the work environment can affect the yield rate or endanger personnel working nearby.

A commercially available system for controlling air flow through work environments to the exhaust system uses a microprocessor, receiving air flow information from a sensor similar to a hot wire anemometer, to control a motor-driven damper. A fault of such a system is that, if the temperature of a gas in the exhaust flow being measured changes, the sensor perceives a change in air flow velocity and a spurious adjustment is triggered. Also, if the composition of the exhaust gas changes, the sensor again incorrectly perceives a change in air flow velocity and a spurious adjustment is triggered. Additionally, if the sensor becomes coated with residue produced during the coating process, the sensor incorrectly perceives a change in the air flow velocity and a spurious adjustment is triggered. Any of these things is very likely to happen in the manufacture of integrated circuits. Furthermore, the spurious adjustments that are triggered are likely to occur at a point in time when the process is most sensitive to air flow instability, which results in compromised product yield. Finally, flammable solvents are commonly used during the manufacturing process and when the processing equipment is cleaned, and therefore, the hot wire anemometer and the circuitry of the flow control system poses a potential risk by being located in an air stream laden with flammable solvents.

Other devices, such as those disclosed in U.S. Pat. No. 3,766,933, issued to Nicholson, U.S. Pat. No. 4,092,998 issued to Taplin, U.S. application No. 4,592,385 issued to Semon, and British patent number 957,118 issued to Decca, Ltd., have been designed to regulate vacuums or high pressure. However, these devices cannot regulate a partial vacuum or mass flow rate accurately enough for the aforementioned manufacturing processes.

DISCLOSURE OF THE INVENTION

The present invention solves the problems found in the prior art systems by providing a self-regulating flow control system. Compared to many of the prior art systems, the present invention in not complex and uses few moving parts. A fluid, typically air, a gas or a mixture of gases, flows through the device from an environment to the evacuation source, e.g. the house exhaust system. The environment has a pressure less than the surrounding ambient pressure. The ambient pressure may be atmospheric pressure or the pressure of the clean room within which the environment is located. The device has a path, through which fluid passes from the input, which is in communication with the environment to the output, which is in communication with the evacuation source, without being vented. Thus, the mass of fluid exiting the device is substantially equal to the mass of fluid entering the device. Within this path, a piston is movably mounted to a piston mounting structure in such a way that the piston may constrict the path at a constriction point. The piston moves in a direction transverse to the flow of fluid in the path at the constriction point. The piston has a distal face exposed to a reference pressure and a frontal face exposed to the fluid in the path on the environment side of the constriction point. In one embodiment, the rigid piston body itself constricts the path. In another embodiment, the rigid piston body has attached thereto a flexible diaphragm that protrudes into the path at the constriction point and that has a movable internal wall attached to the piston and a movable external wall attached to the piston mounting structure. The lengths of these movable walls can vary as the piston moves. A restoring force is exerted on the piston in a direction that tends to move the piston so as to widen the path at the constriction point. The force exerted on the piston by the pressure of the fluid in the path on the evacuation source side of the constriction point is transverse to the direction of movement of the piston, and therefore does not materially affect the operation of the device. Thus, the device is able to accurately control either the partial vacuum or the mass flow rate despite large fluctuations in the vacuum created by the evacuation source. The restoring force and the forces exerted on the piston by the reference pressure and the pressure of the fluid in the path on the environment side of the constriction point are generally parallel to the direction of movement of the piston.

The restoring force can be exerted by a spring, or by the weight of the piston. In a preferred embodiment of the invention, the restoring force is exerted merely by the weight of the piston without the use of a spring or any other means of exerting a force.

In a preferred embodiment of the invention, the reference pressure is equal to the ambient pressure. In this embodiment, the pressure of the fluid in contact with the frontal face of the piston can be directly proportional to the pressure of the fluid in the environment, so that the piston is caused to adjust the size of the path at the constriction point in such a way that a substantially constant partial vacuum is maintained in the environment with respect to the ambient pressure.

This partial vacuum control system embodiment can easily be adapted to become a mass flow control system by simply introducing a throttling valve in the path between the environment and the piston. This throttling valve can be adjustable, thereby changing the cross-sectional area of the path at that point, so that the mass flow rate can be adjusted.

In a preferred embodiment of the invention, the device includes a manifold within which the piston is movably mounted. The manifold has a side wall generally parallel to the direction of movement of the piston. This side wall has disposed therein an evacuation port, located at the constriction point, through which the manifold is in fluid communication with the evacuation means. The manifold also has an environment port through which the manifold is in fluid communication with the environment. This environment port may be located in the side wall as well.

There are several ways of forming a seal between the piston and the piston mounting structure, which may be the manifold. One way of forming such a seal is by using the flexible diaphragm discussed above. Alternatively, the piston and the piston mounting structure can be machined to a fine tolerance such that they fit snugly together, forming a good seal without creating undue friction between the piston and the piston mounting structure. In a preferred embodiment a ferrofluid, an oil-like fluid having magnetic properties, is used to form a seal between the piston and the piston mounting structure. A magnet is mounted on either the piston or the piston mounting structure for holding the ferrofluid in position between the piston and the piston mounting structure.

In an embodiment of the invention that is used to regulate mass flow, a modulator is mounted proximate to the piston for directing the fluid so that the fluid flows transverse to the frontal face of the piston. As the velocity of the fluid moving through the device increases, the force exerted on the frontal face of the piston by the pressure of the fluid in the path decreases, causing the piston to move in the direction to constrict the path at the constriction point.

In another version of the invention for regulating the mass flow rate of fluid flowing from the input of the device to the output, the device includes a path through which the fluid passes form the input to the output. Preferably, the path is not vented between the input and the output, so that the mass of fluid passing through the input is essentially equal to the mass of fluid exiting form the output. A venturi is disposed in this path. Part of the venturi is formed with the frontal face of a piston. The piston has a distal face exposed to a reference pressure, which is preferably the pressure of the fluid at the input. The piston is movably mounted so that as the velocity of the fluid flowing through the path increases, the difference between the reference pressure and the pressure in the venturi increases causing the piston to move in a direction narrowing the venturi. A restoring force is exerted on the piston in the direction that tends to move the piston so as to widen the venturi. The various means of exerting a restoring force discussed above may be applied in this device.

In a preferred embodiment of this venturi device, the piston is hingedly mounted so as to rotate about a hinged point. The piston must still be able to move in such a manner as to narrow or widen the venturi. The piston in this embodiment includes a slidable weight that can be moved closer to or further from the hinge point. By moving this slidable weight the tendency of the piston to move to widen the venturi may be altered. A servo motor may be used to control the position of the slidable weight.

This venturi device regulates the mass flow rate of the fluid by lessening the cross-sectional area of the path as the velocity of the fluid increases. Thus, as the velocity of the fluid increases the cross-sectional area of the path at the point of the venturi decreases, causing a substantially constant mass flow rate. By moving the slidable weight one can set this device to maintain the desired mass flow rate.

BRIEF DESCRIPTION OF THE DRAWINGS

FIG. 6A shows a slightly different version of the FIG. 6 embodiment.

FIG. 7 shows how accurately the FIGS. 6 and 6A devices can maintain a constant fluid velocity.

DESCRIPTION OF SPECIFIC EMBODIMENTS

Figure 1:
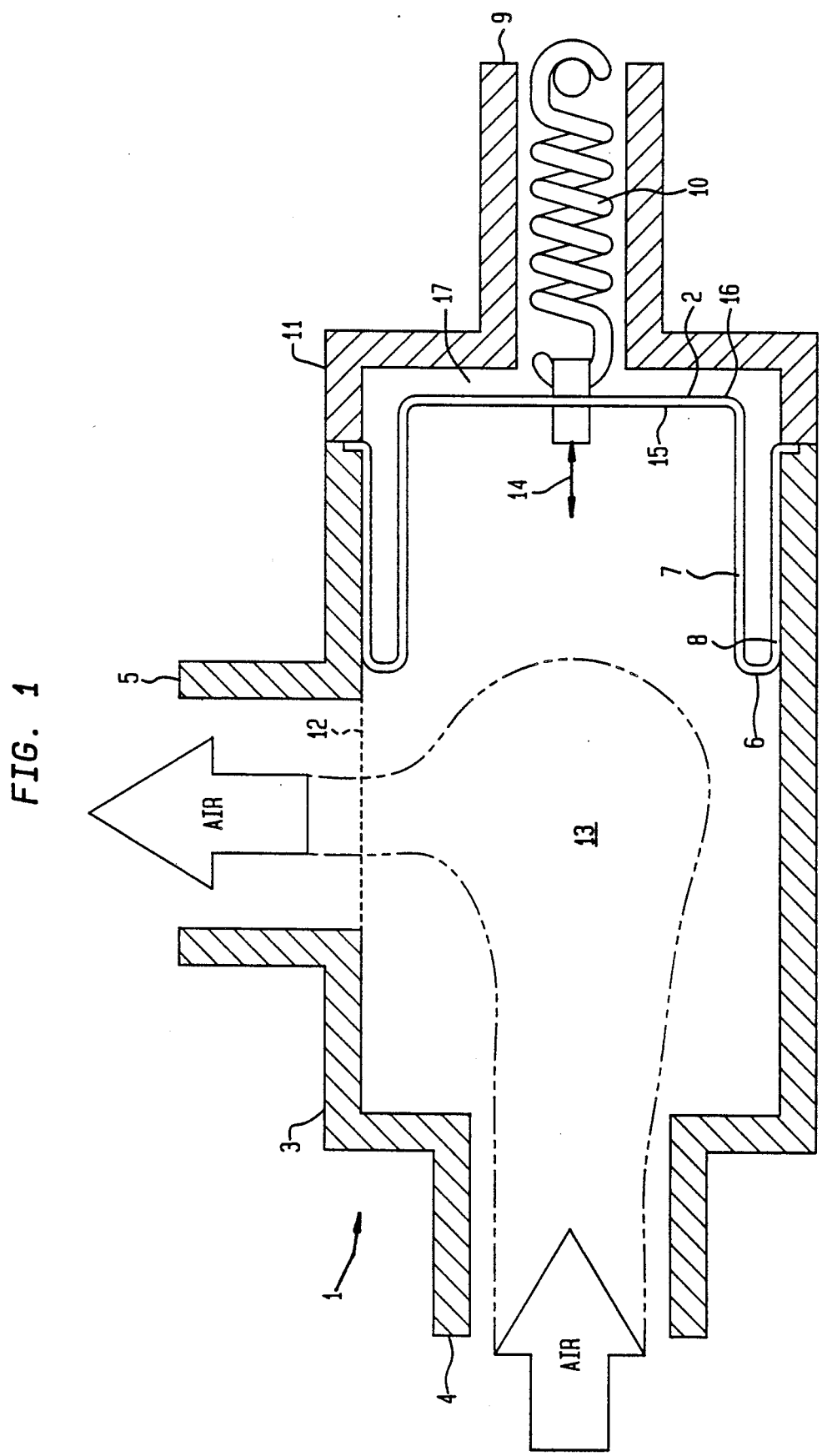
FIG. 1 shows an embodiment of the invention that has a rolling diaphragm and a spring.
Figure 2:
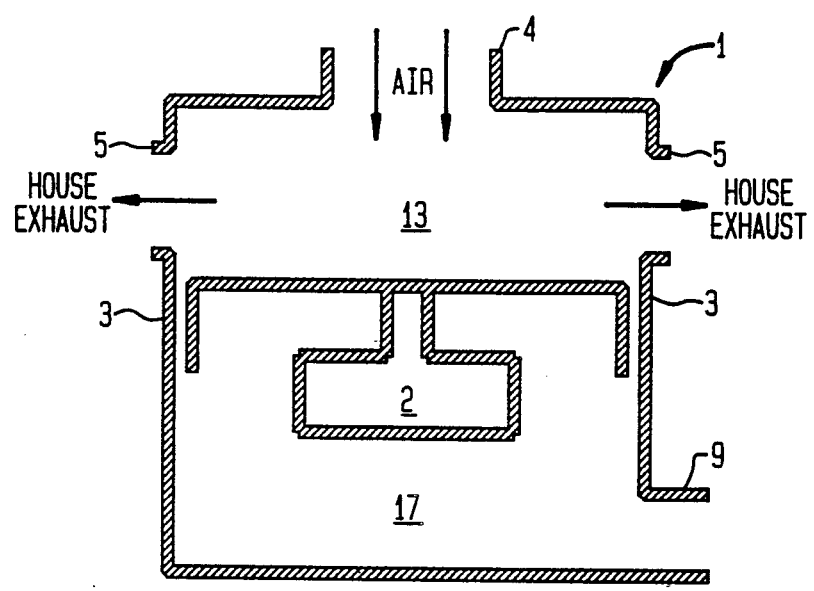
FIGS. 2 and 3 show embodiments of the invention that do not use a rolling diaphragm or a spring.
Figure 3:
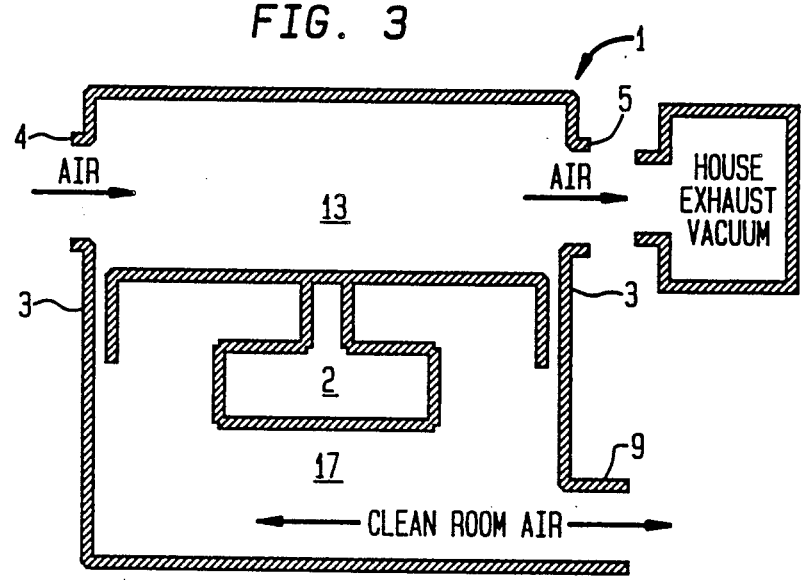

FIGS. 1, 2, and 3 all show embodiments of the invention that are used to control a partial vacuum in the work environment with respect to the ambient pressure. The device shown in FIG. 1 has a manifold 1, which has a piston 2 mounted therein. The side wall 3 of the manifold 1 is substantially parallel to the direction of motion of the piston 2 as shown by the double headed arrow 14. An evacuation port 5, which connects the device to the house exhaust system, i.e. the evacuation source, is disposed in the side wall 3. The manifold 1 also has an environment port 4, which connects the device to the work environment. The piston 2 has attached around the periphery thereof a rolling diaphragm 6 which is also connected to the manifold 1. The rolling diaphragm 6 forms a seal between the piston 2 and the manifold 1. As seen in FIG. 1, the diaphragm protrudes into the plenum 13, which is bounded by the manifold 1 and the piston 2. As the piston 2 moves back and forth, the lengths of the inner wall 7 and the outer wall 8 of the diaphragm 6 change. As the piston 2 moves towards the left in the figure, the diaphragm 6 begins to constrict the evacuation port 5. The evacuation port 5 can be covered with a screen 12, upon which the outer wall 8 of the diaphragm 6 can repose.

The piston 6 has two faces, a frontal face 15 exposed to the plenum 13 and a distal face 16 exposed to a reference pressure 9. The piston is attached to a spring 10 that exerts a force on the piston in a direction so as to tend to open the evacuation port 5. An endcap 11 may be attached to the manifold 1 at the point where the diaphragm 6 is attached to the manifold. The endcap and the piston 2 defines a chamber 17. The pressure in the chamber 17 is the reference pressure 9. Preferably, the reference pressure 9 is the ambient pressure, e.g. the pressure in the clean room where the work environment is located.

Essentially three forces affect the movement of the piston 2: (i) the pressure of the gas in the plenum 13, (ii) the reference pressure 9 and (iii) the restoring force exerted by the spring 10. Because the evacuation port 5 is transverse to the movement 14 of the piston 2, any force exerted by the house exhaust system does not substantially affect the movement of the piston 2. When the device is at equilibrium, the three forces affecting the movement of the piston balance each other. If the pressure in the plenum 13 decreases, which would occur if the pressure in the work environment decreased or the pressure of the house exhaust system decreased (i.e. when the house exhaust system creates a stronger vacuum), the piston 2 tends to move to the left, thereby causing the evacuation port 5 to be further constricted by the protrusion of the rolling diaphragm 6. Because the evacuation port 5 is constricted, less gas can flow out of the plenum into the house exhaust system, thereby causing the pressure in the plenum to increase. The piston continues to move to the left and the pressure in the plenum 13 continues to increase until the three forces once again offset each other. If the pressure in the plenum increases, which may result from the pressure in the work environment increasing or the vacuum exerted by the house exhaust system weakening, the piston 2 would be forced to the right, opening up the evacuation port 5 and further exposing the plenum 13 to the house exhaust system.

In order to maintain a constant partial vacuum in the work environment with respect to the ambient pressure, one may set the reference pressure equal to the ambient pressure by venting the chamber 17 to the ambient pressure, e.g. the clean room. If the ambient pressure in the clean room increases, the piston 2 will tend to move to the left, further occluding the evacuation port 5, and thereby increasing the pressure in the plenum 13. The increased pressure in the plenum will cause increased pressure in the work environment. Thus, the device insures that as the ambient pressure increases the pressure in the work environment will increase correspondingly so as to maintain a constant partial vacuum.

FIG. 2 shows an alterative embodiment of the partial vacuum control system. In this embodiment the environment port 4 is located at the top of the device and there is a plurality of evacuation ports 5 arranged radially around the manifold 1. In this system the piston 2 moves vertically. A rolling diaphragm is not used, so the evacuation ports 5 must be occluded by the rigid portion of the piston 2. Instead of using a spring to exert on the piston a restoring force tending to move the piston to open the evacuation port, this restoring force is exerted simply by the weight of the piston 2. In order to effect a seal between the piston 2 and the side wall 3, the piston 2 and the manifold 1 must be properly toleranced in order to insure a snug fit without creating too much friction between the piston and the manifold. Otherwise, the FIG. 1 and FIG. 2 embodiments work the same way.

In the FIG. 2 embodiment the restoring force may be supplemented by including a spring, so that the restoring force includes both the weight of the piston and the force exerted by the spring. In the FIG. 1 embodiment, it is preferred that the spring 10 is linear, i.e. it stretches an amount directly proportional to the force applied.

The shape of the evacuation port 5 may be rectangular so that the amount of change in the pressure differential between the plenum 13 and the chamber 17 is directly proportional to the area of the port that is occluded. A non-linear spring could also be used, as could the shape of the evacuation port 5 be changed, so that the system provides non-linear corrections to pressure changes.

FIG. 3 shows an embodiment of the vacuum regulator that is very similar to that shown in FIG. 2. The difference is that the environment port 4 is disposed in a side wall 3 of the manifold 1, so that as the piston rises it tends to occlude both the environment port 4 as well as the evacuation port 5. The principle of operation of the FIG. 3 embodiment is the same as that of the FIGS. 1 and 2 embodiments. That is, as the pressure in the work environment increases the piston moves so as to open the communication with the house exhaust system, and as the pressure in the work environment decreases the piston moves so as to decrease the communication with the house exhaust system.

Figure 4:
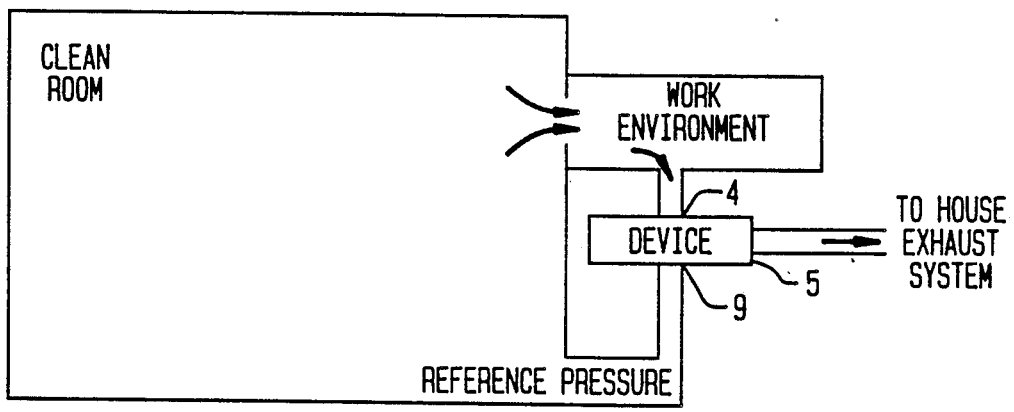
FIG. 4 shows how the devices shown in FIGS. 1, 2 and 3 can be used to maintain a constant partial vacuum in a work environment with respect to a clean room.

FIG. 4 shows how the device is arranged to maintain a constant partial vacuum within a work environment with respect to a clean room. The environment port 4 of the device is connected to the work environment. The evacuation port 5 is connected to the house exhaust system. The ambient pressure of the clean room is used as the reference pressure. With this arrangement, assuming that the house exhaust system is providing a strong enough vacuum, the pressure in the work environment should be less than the ambient pressure of the clean room by a substantially constant amount.

Figure 5:
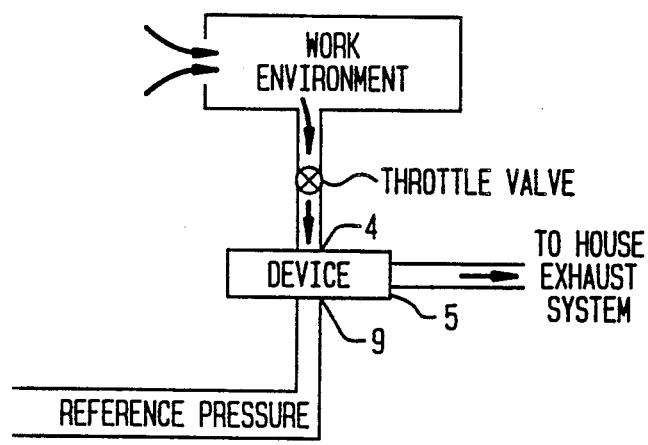
FIG. 5 shows how the devices shown in FIGS. 1, 2 and 3 can be adapted to maintain a constant mass flow rate.

FIG. 5 shows how the devices of FIGS. 1, 2, and 3 can be adapted to regulate the mass flow rate from a work environment to the house exhaust system. This is accomplished by simply placing a throttling valve, which constricts the cross-sectional area of the fluid flow path, between the work environment and the environment port 4 of the device. Because the pressure drop across the throttling valve is relatively large, the reference pressure may be the pressure in the work environment.

Figure 6:
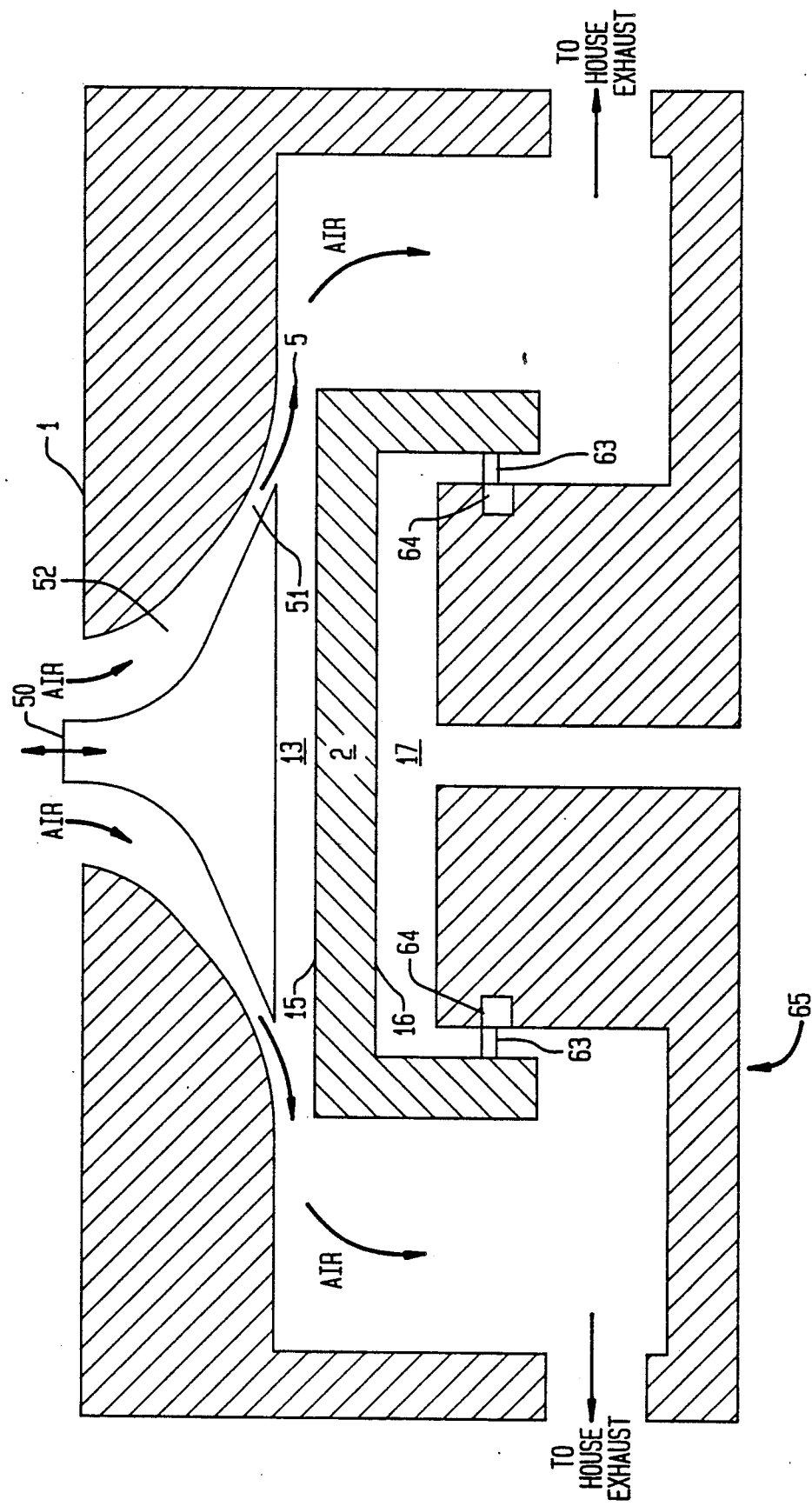
FIG. 6 shows another embodiment of the invention that can maintain a constant mass flow rate.

FIG. 6 shows a device that regulates the mass flow rate of fluid flowing through the device. Like the devices described above, this device has a piston 2 with a frontal face 15 exposed to a plenum 13 and a distal face 16 exposed to a chamber 17. The chamber 17 has a reference pressure, which is preferably the ambient pressure. The device also has an environment port 4 for connecting the device to the work environment, and an evacuation port 5, through which the fluid flows to the house exhaust and which is constricted by the piston 2 as the piston moves up. This device uses a modulator 50 which directs the fluid flowing from the environment port 4 to the evacuation port 5, such that the fluid flows transversely across the frontal face 15 of the piston 2. The modulator 50 and the manifold 1 form an annular channel 52, which directs the fluid flowing vertically downward so that the fluid flows outwardly and substantially horizontally. This channel 56 is a preferably curved as shown in FIG. 6. It is also preferred that the channel taper to a narrow opening 51; otherwise the expanding annular channel would cause the fluid to lose its velocity. By tapering the channel 52 the velocity of the fluid is preserved. As the fluid flows out of the channel 52 and across the edge of the piston, the Bernoulli effect causes the pressure in the plenum 13 to drop, thereby lifting the piston 2. If the velocity of the fluid increases, the pressure in the plenum 13 will drop further, causing the piston to rise further, and in turn further constricting the evacuation port 5. By constricting the evacuation port 5 the flow of the fluid is retarded. If the velocity of the fluid through the device decreases the pressure in the plenum 13 should thereby increase causing the piston to drop, and in turn causing the evacuation port to open. Thus, the velocity and therefore the mass flow rate of the fluid through the system can be kept fairly constant by the device.

The desired flow rate through the device can be altered by moving the modulator up and down. Moving the modulator up and down affects the size of the annular channel 52.

In order to obtain a seal between the piston 2 and the piston mounting structure 65, the piston and the piston supporting structure can be made to fit snugly against each other, or a diaphragm can be used. Another means of achieving a seal is to use a ferrofluid, which is an oil-like fluid with magnetic properties. A magnet 64 is placed around the piston supporting structure 65 proximate the piston 2, or alternately around the piston 2 proximate to the supporting structure 65. This magnet 64 holds the ferrofluid 63 in place.

FIG. 6A shows a variation of the FIG. 6 device. In this embodiment the piston 2 is located inside the piston mounting structure 65. A diaphragm 6 serves as a seal between the piston 2 and the piston mounting structure. The modulator 50 is held in place by a locking device 66.

FIG. 7 shows how accurately the mass flow controllers shown in FIGS. 6 and 6A can regulate the air velocity despite wide variations in the strength of the vacuum provided by the house exhaust system. The desired air velocity can be obtained by adjusting the position of the modulator. The graph shows that results with the modulator in five different positions corresponding to different sizes in the input opening. As can be seen in the graph, as long as there is a sufficient vacuum created by the house exhaust, approximately −2.0 inches of water, the air velocity remains quite constant, especially when the input is not open all the way.

Figure 8:
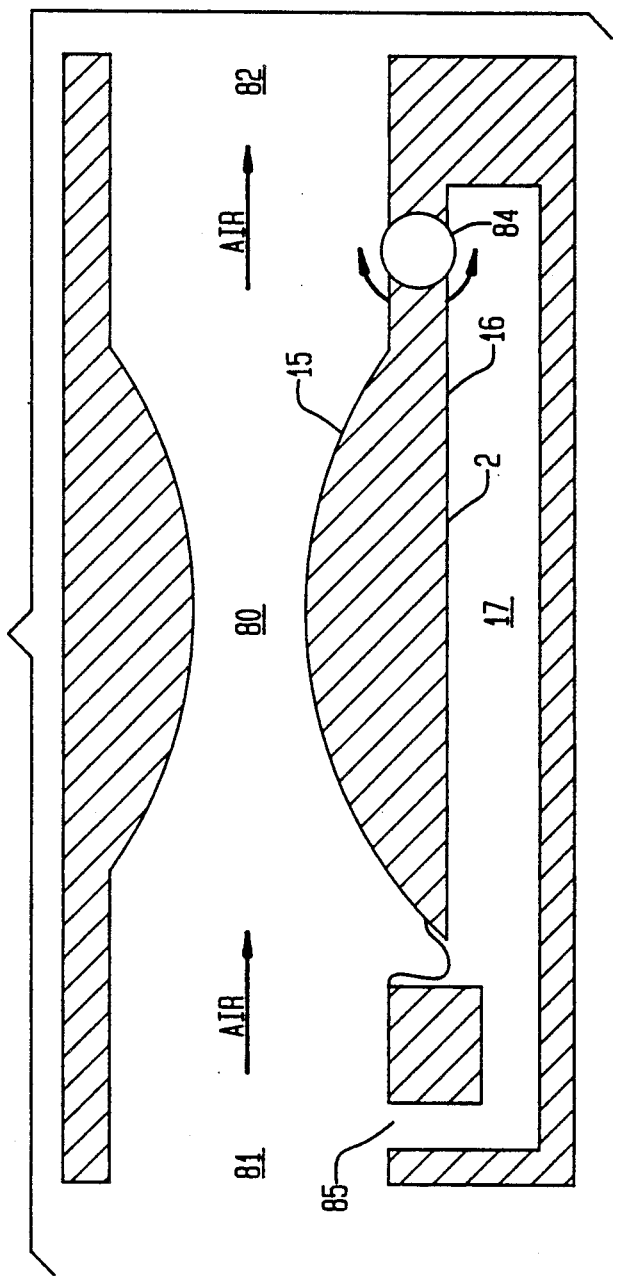
FIG. 8 shows another embodiment of the invention that is used for maintain a constant mass flow rate.

FIG. 8 shows another mass flow regulator. In this device fluid flows from the input 81, through a venturi valve 80, to an output 82. Part of the venturi is made of a movable piston 2, which may move up to narrow the venturi or move down to widen the venturi. Preferably, the piston 2 is attached to the body of the device by a hinge 84 located near the output 82 of the device. This allows the piston to swing up or down. The lower face of the piston 2, the distal face 16, is exposed to a chamber 17 having a reference pressure. Preferably, this chamber 17 is vented to the input 81 by means of a port 85, such that the reference pressure is equal to the pressure of the fluid at the input 81. As the fluid flows through the device, the pressure in the venturi decreases because of the Bernoulli effect. This causes the piston 2 to tend to move up to narrow the venturi. The weight of the piston 2 tends to pull the piston downward. Another means of exerting a downward force on the piston 2, i.e. a restoring force, would be with a spring. The force exerted by the weight of the piston, or other restoring force, balances with the force caused by the pressure differential between the chamber 17 and the venturi 80, causing the piston to float (assuming the velocity of the fluid is great enough). As the velocity of the fluid increases, the pressure in the venturi, 80 will further decrease causing the piston to rise further. Thus, the cross-sectional area of the venturi 80 decreases. Since the mass flow rate of the fluid is equal to the product of the fluid's density, the cross-sectional area of the pathway and the velocity of the fluid, the mass flow rate should remain fairly constant, i.e. the increased velocity is offset by the decreased cross-sectional area.

Figure 9:
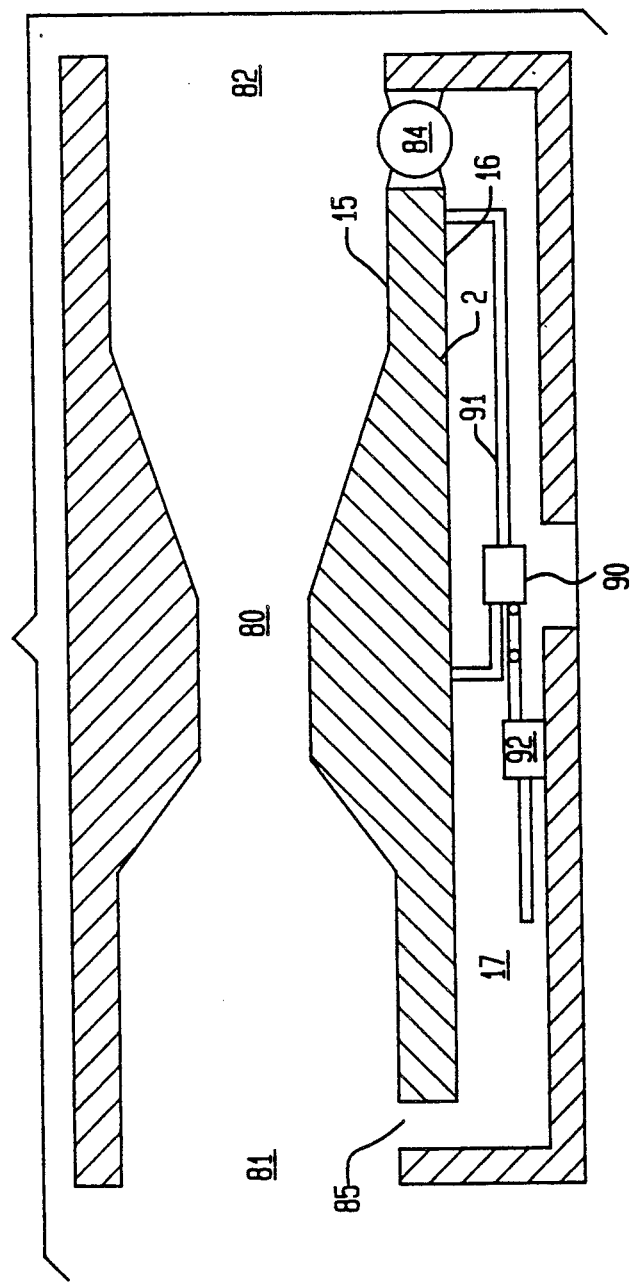
FIG. 9 shows an adjustable version of the FIG. 8 embodiment.

FIG. 9 shows a modified version of the FIG. 8 device, wherein the device can be adjusted to attain various mass flow rates. This is done by using a slidable mass 90. The further to the left and away from the hinge 84 the mass 90 is located, the greater the tendency of the piston to move down and widen the venturi. The further to the right and closer to the hinge 84 the mass 90 is placed, the greater the tendency of the piston to rise and narrow the venturi. Thus, the desired mass flow rate can be increased by moving the mass 90 to the left, or decreased by moving the mass to the right. The movement of the mass can, of course, be accomplished manually; however, it can be accomplished remotely by using a servo motor 92 which can move the mass 90 back and forth. The servo motor can then be controlled electrically.

What is claimed is:

1. A device for regulating the flow of fluid from an environment, the environment having a pressure less than the ambient pressure, to an evacuation means, the device comprising:

a path, through which the fluid passes from an input in fluid communication with the environment to an output in fluid communication with the evacuation means, the path not being vented at any point between the input and the output, so that the mass of fluid exiting the device through the output is substantially equal to the mass of fluid entering the device from the input;

a piston movably mounted to a piston mounting structure, the piston being so mounted that it may constrict the path at a constriction point, and so that it may move in a direction transverse to the path at the constriction point, the piston having (i) a distal face exposed to a reference pressure, (ii) a frontal face directly across which the fluid flows and which is located in the path on the environment side of the constriction point, wherein the distal and frontal faces have approximately the same area; and restoring means, including the weight of the piston, for exerting a force on the piston in a direction that tends to move the piston so as to widen the path at the constriction point;

so that the force exerted on the piston by the pressure of the fluid in the path on the evacuation means side of the constriction point is transverse to the direction of movement of the piston, and the forces exerted on the piston by the reference pressure, the pressure of the fluid in the path on the environment side of the constriction point, and the restoring means are generally parallel to the direction of movement of the piston.

2. A device according to claim 1, wherein the restoring means includes a spring.

3. A device according to claim 1, wherein the restoring means consists only of the weight of the piston.

4. A device for regulating the flow of fluid from an environment, the environment having a pressure less than the ambient pressure, to an evacuation means, the device comprising:

a path, through which the fluid passes from an input in fluid communication with the environment to an output in fluid communication with the evacuation means, the path not being vented at any point between the input and the output, so that the mass of fluid exiting the device through the output is substantially equal to the mass of fluid entering the device from the input;

a piston movably mounted to a piston mounting structure, the piston being so mounted that it may constrict the path at a constriction point, and so that it may move in a direction transverse to the path at the constriction point, the piston having (i) a distal face exposed to a reference pressure, (ii) a frontal face exposed to the fluid in the path on the environment side of the constriction point;

restoring means, for exerting a force on the piston in a direction that tends to move the piston so as to widen the path at the constriction point;

so that the force exerted on the piston by the pressure of the fluid in the path on the evacuation means side of the constriction point is transverse to the direction of movement of the piston, and the forces exerted on the piston by the reference pressure, the pressure of the fluid in the path on the environment side of the constriction point, and the restoring means are generally parallel to the direction of movement of the piston, wherein the piston includes a flexible diaphragm that may protrude into the path at the constriction point and that has a movable internal wall attached to the piston and a movable external wall attached to the piston mounting structure, wherein the lengths of the movable walls can vary as the piston moves.

5. A device according to claim 4, wherein the restoring means includes a spring.

6. A device according to claim 4, wherein the restoring means includes the weight of the piston.

7. A device according to claim 4, wherein the restoring means consists only of the weight of the piston.

8. A device according to claim 4, wherein the reference pressure is equal to an ambient pressure.

9. A device according to claim 8, wherein the pressure of the fluid in the path in contact with the frontal face of the piston is directly proportional to the pressure of the fluid in the environment, so that the piston is caused to adjust the size of the path at the constriction point in such a way that a substantially constant partial vacuum is maintained in the environment with respect to the ambient pressure.

10. A device according to claim 1, further including a throttling valve means disposed in the path between the environment and the piston, for constricting the path, such that a substantially constant fluid mass flow rate through the device may be maintained.

11. A device according to claim 10, wherein the reference pressure is equal to an ambient pressure.

12. A device for regulating the flow of fluid from an environment, the environment having a pressure less than the ambient pressure, to an evacuation means, the device comprising:

a path, through which the fluid passes from an input in fluid communication with the environment to an output in fluid communication with the evacuation means, the path not being vented at any point between the input and the output, so that the mass of fluid exiting the device through the output is substantially equal to the mass of fluid entering the device from the input;

a piston movably mounted to a piston mounting structure, the piston being so mounted that it may constrict the path at a constriction point, and so that it may move in a direction transverse to the path at the constriction point, the piston having (i) a distal face exposed to a reference pressure, (ii) a frontal face exposed to the fluid in the path on the environment side of the constriction point;

restoring means, including the weight of the piston, for exerting a force on the piston in a direction that tends to move the piston so as to widen the path at the constriction point; and a throttling valve means disposed in the path between the environment and the piston, for constricting the path, such that a substantially constant fluid mass flow rate through the device may be maintained, wherein the throttling valve means is adjustable so that the amount that the path is constricted between the environment and the piston may be changed;

so that the force exerted on the piston by the pressure of the fluid in the path on the evacuation means side of the constriction point is transverse to the direction of movement of the piston, and the forces exerted on the piston by the reference pressure, the pressure of the fluid in the path on the environment side of the constriction point, and the restoring means are generally parallel to the direction of movement of the piston.

13. A device according to claim 12, wherein the reference pressure is equal to an ambient pressure.

14. A device according to claim 10, where the restoring means consists only of the weight of the piston.

15. A device according to claim 1, further including a manifold disposed in the path, the piston being movably mounted in the manifold, the manifold including the piston mounting structure, and having a side wall generally parallel to the direction of movement of the piston, an environment port, through which the manifold is in fluid communication with the environment, and an evacuation port, located in the side wall at the constriction point, through which the manifold is in fluid communication with the evacuation means.

16. A device according to claim 15, wherein the environment port is located in the side wall.

17. A device for regulating the flow of fluid from an environment, the environment having a pressure less than the ambient pressure, to an evacuation means, the device comprising:

a path, through which the fluid passes from an input in fluid communication with the environment to an output in fluid communication with the evacuation means, the path not being vented at any point between the input and the output, so that the mass of fluid exiting the device through the output is substantially equal to the mass of fluid entering the device from the input;

a piston movably mounted to a piston mounting structure, the piston being so mounted that it may constrict the path at a constriction point, and so that it may move in a direction transverse to the path at the constriction point, the piston having (i) a distal face exposed to a reference pressure, (ii) a frontal face exposed to the fluid in the path on the environment side of the constriction point;

restoring means, for exerting a force on the piston in a direction that tends to move the piston so as to widen the path at the constriction point; and a ferrofluid forming a seal between the piston and the piston mounting structure, and a magnet, mounted on either of the piston or the piston mounting structure, for holding the ferrofluid in a position to form a seal between the piston and the piston mounting structure;

so that the force exerted on the piston by the pressure of the fluid in the path on the evacuation means side of the constriction point is transverse to the direction of movement of the piston, and the forces exerted on the piston by the reference pressure, the pressure of the fluid in the path on the environment side of the constriction point, and the restoring means are generally parallel to the direction of movement of the piston.

18. A device for regulating the flow of fluid from an environment, the environment having a pressure less than the ambient pressure, to an evacuation means, the device comprising:

a path, through which the fluid passes from an input in fluid communication with the environment to an output in fluid communication with the evacuation means, the path not being vented at any point between the input and the output, so that the mass of fluid exiting the device through the output is substantially equal to the mass of fluid entering the device from the input;

a piston movably mounted to a piston mounting structure, the piston being so mounted that it may constrict the path at a constriction point, and so that it may move in a direction transverse to the path at the constriction point, the piston having (i) a distal face exposed to a reference pressure, (ii) a frontal face exposed to the fluid in the path on the environment side of the constriction point, wherein the frontal face of the piston has a central area and a perimeter;

restoring means, for exerting a force on the piston in a direction that tends to move the piston so as to widen the path at the constriction point; and a modulator mounted proximate to the piston for redirecting the fluid so that the fluid flows across the frontal face of the piston away from the central area radially outward towards the perimeter, such that the direction of the fluid flow is redirected from a direction that is generally parallel to the direction of movement of the piston to directions that are transverse to the direction of movement of the piston, so that, as the velocity of the fluid moving through the device increases, the force exerted on the frontal face of the piston by the pressure of the fluid in the path decreases, so that the piston tends to move to further constrict the path at the constriction point;

so that the force exerted on the piston by the pressure of the fluid in the path on the evacuation means side of the constriction point is transverse to the direction of movement of the piston, and the forces exerted on the piston by the reference pressure, the pressure of the fluid in the path on the environment side of the constriction point, and the restoring means are generally parallel to the direction of movement of the piston.

19. A device according to claim 18, wherein the reference pressure is equal to the ambient pressure.

20. A device according to claim 18, wherein the restoring means includes the weight of the piston.

21. A device according to claim 20, wherein the reference pressure is equal to the ambient pressure.

22. A device according to claim 18, wherein the restoring means consists only of the weight of the piston.

23. A device according to claim 23, wherein the reference pressure is equal to the ambient pressure.

24. A device for regulating the mass flow rate of fluid flowing from an input to an output, the device comprising:

a path through which the fluid passes from the input to the output;

a venturi disposed in the path;

a piston having a frontal face forming part of the venturi and a distal face exposed to a reference pressure, the piston being movably mounted so that as the velocity of the fluid flowing through the path increases the difference between the reference pressure and the pressure in the venturi increases such that the piston tends to move so as to narrow the venturi; and restoring means, including the weight of the piston, for exerting a force on the piston in a direction that tends to move the piston so as to widen the venturi, wherein the piston is hingedly mounted to that the piston rotates about a hinge port in such a manner to alter the width of the venturi, the piston including a slidable wight that may be moved closure towards or further from the hinge point so as decrease or increase the tendency of the piston to widen the venturi.

25. A device according to claim 24, further including movement means for controlling the position of the slidable weight with respect to the hinge port.

26. A device for regulating the flow of fluid from an environment, the environment having a pressure less than the ambient pressure, comprising:

(i) a manifold including a side wall, an evacuation port disposed in the side wall through which the manifold is in communication with an evacuation means and an environment port through which the manifold is in communication with the environment;

(ii) a piston having a frontal face and a distal face, movably mounted in the manifold with the distal face exposed to ambient pressure, the piston being mounted so that it moves in a direction substantially parallel to the side wall and transverse to the evacuation port, and so that a relatively lower pressure in the manifold in comparison to the ambient pressure results in a force on the piston in a direction in which the piston may move across the evacuation port so as to partially occlude the evacuation port, the piston being mounted with respect to the environment port so that the piston does not occlude the environment port; and (iii) restoring means for exerting a force on the piston in a direction which may move the piston so as to tend to open the evacuation port;

so that the pressure in the manifold changes, the piston may partially occlude or expose the manifold to the evacuation means, thus ensuring that an approximately constant partial vacuum is maintained with respect to the environment.

27. A device for regulating the flow of fluid from an environment, the environment having a pressure less than the ambient pressure, comprising:
- (i) a manifold including a side wall, an evacuation port disposed in the side wall through which the manifold is in communication with an evacuation means and an environment port through which the manifold is in communication with the environment;
- (ii) a piston having a frontal face and a distal face, movably mounted in the manifold with the distal face exposed to ambient pressure,
  - the piston being mounted so that it moves in a direction substantially parallel to the side wall and transverse to the evacuation port, and so that a relatively lower pressure in the manifold in comparison to the ambient pressure results in a force on the piston in a direction in which the piston may move across the evacuation port so as to partially occlude the evacuation port, wherein the piston includes a flexible diaphragm; and
- (iii) restoring means for exerting force on the piston in a direction which may move the piston so as to tend to open the evacuation port;
  - so that the pressure in the manifold changes, the piston may partially occlude or expose the manifold to the evacuation means, thus ensuring that an approximately constant partial vacuum is maintained with respect to the environment.

28. A device according to claim 26, wherein the restoring means includes a spring.

29. A device according to claim 26, wherein the restoring means includes the weight of the piston.

30. A device according to claim 26, wherein the restoring means consists only of the weight of the piston.

31. A device for regulating the flow of fluid from an environment, the environment having a pressure less than the ambient pressure, comprising:
- (i) a manifold including a side wall, an evacuation port disposed in the side wall through which the manifold is in communication with an evacuation means and an environment port through which the manifold is in communication with the environment;
- (ii) a piston having a frontal face and a distal face, movably mounted in the manifold with the distal face exposed to ambient pressure,
  - the piston being mounted so that it moves in a direction substantially parallel to the side wall and transverse to the evacuation port, and so that a relatively lower pressure in the manifold in comparison to the ambient pressure results in a force on the piston in a direction in which the piston may move across the evacuation port so as to partially occlude the evacuation port; and
- (iii) restoring means for exerting a force on the piston in a direction which may move the piston so as to tend to open the evacuation port;
  - so that the pressure in the manifold changes, the piston may partially occlude or expose the manifold to the evacuation means, thus ensuring that an approximately constant partial vacuum is maintained with respect to the environment
  - wherein the piston includes a relatively rigid central portion and a flexible diaphragm along the periphery of the piston, and the piston is disposed in the manifold so that the flexible diaphragm forms a peripherally disposed protrusion along the side wall of the manifold, the protrusion having a movable internal and movable external wall whose lengths can vary as the central portion of the diaphragm moves in relation to the periphery.

32. A device according to claim 31, further comprising:
- a screen, covering the evacuation port and on which a portion of the external wall of the diaphragm may repose when the port is being occluded in whole or in part.

33. A device according to claim 32, wherein the restoring means includes the weight of the piston.

34. A device for regulating the flow of fluid from an environment to an evacuation means, the device comprising:
- a path, through which the fluid passes from an input in fluid communication with the environment to an output in fluid communication with the evacuation means, the path not being vented at any point between the input and the output, so that the mass of fluid exiting the device through the output is substantially equal to the mass of fluid entering the device from the input;
- a piston movably mounted to a piston mounting structure, the piston being so mounted that it may constrict the path at a constriction point, and so that it may move in a vertical direction and transverse to the path at the constriction point, the piston having (i) a distal face at the bottom of the piston exposed to a reference pressure, (ii) a frontal face at the top of the piston across which the fluid flowing through the path on the environment side of the constriction point directly passes, the piston being mounted so that the weight of the piston exerts a force on the piston in a direction that tends to move the piston so as to widen the path at the constriction point, the force exerted on the piston by the pressure of the fluid in the path on the evacuation means side of the constriction point is transverse to the direction of movement of the piston, and the forces exerted on the piston by the reference pressure, the pressure of the fluid in the path on the environment side of the constriction point, and the weight of the piston are generally parallel to the direction of movement of the piston.

35. A device according to claim 34, wherein the reference pressure is equal to an ambient pressure.

36. A device for regulating the flow of fluid from an environment, the environment having a pressure less than the ambient pressure, to an evacuation means, the device comprising:
- a path, through which the fluid passes from an environment port in fluid communication with the environment to at least two evacuation ports in fluid communication with the evacuation means, the path not being vented at any point between the environment port and the evacuation ports, so that the mass of fluid exiting the device through the evacuation ports is substantially equal to the mass of fluid entering the device from the environment port;
- a piston having a (i) distal face exposed to a reference pressure and (ii) a frontal face with the center and a perimeter, the piston being movably mounted adjacent to the evacuation ports so that the perimeter of the frontal face may constrict the path at the evacuation ports, and so that the piston may move in a direction transverse to the path at the evacuation ports, wherein the environment port is located opposite from the center of the frontal face and the two evacuation ports are spaced away from each other so that the path is redirected from a direction that is generally parallel to the direction of movement of the piston to at least two directions extending radially from the center of the frontal face to the at least two evacuation ports; and restoring means, including the weight of the piston, for exerting a force on the piston in a direction that tends to move the piston so as to widen the path at the constriction points.

37. A device according to claim 36, wherein the reference pressure is equal to an ambient pressure.

38. A device for regulating the mass flow rate of fluid flowing from an input to an output, the device comprising:
- a path through which the fluid passes from the input to the output;
- a venturi disposed in the path; and
- a piston having on its top a frontal face forming part of the venturi, such that fluid flows directly over the frontal face, and on the piston's bottom a distal face exposed to a reference pressure, the piston being movably mounted so that as the velocity of the fluid flowing through the path increases the difference between the reference pressure and the pressure in the venturi increases such that the piston tends to move so as to narrow the venturi, the piston being mounted so that the weight of the piston exerts a force on the piston in a direction that tends to move the piston so as to widen the venturi.

* * * * *